United States Patent Office 3,290,310
Patented Dec. 6, 1966

3,290,310
2,4,6,8,9 - PENTAAZA - BICYCLO - [3,3,1]-NONA-2,6-DIENES AND PROCESS FOR THEIR MANUFACTURE
Max Morf, Riehen, and Werner Heizler, Basel, Switzerland, assignors to Ciba Limited, Basel, Switzerland, a company of Switzerland
No Drawing. Filed Dec. 17, 1964, Ser. No. 419,191
Claims priority, application Switzerland, Jan. 17, 1964, 522/64
6 Claims. (Cl. 260—249.9)

The present invention is based on the observation that by reacting dicyandiamide with amine salts and formaldehyde bicyclic compounds are obtained which have valuable technical properties, and provides a process for the manufacture of 2,4,6,8,9-pentaaza-bicyclo-[3,3,1]nona-2,6-dienes of the general formula (I) 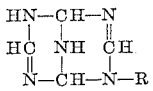

in which R represents a hydrogen atom or an unsubstituted or substituted aliphatic, cycloaliphatic, aromatic or heterocyclic radical, wherein a salt of a basic compound of the general formula R—NH$_2$—in which R represents a hydrogen atom or an unsubstituted or substituted aliphatic, cycloaliphatic, aromatic or heterocyclic radical—is reacted in an acid aqueous solution with dicyandiamide and formaldehyde at a temperature above 65° C., in the molecular ratio of dicyandiamide to the salt of the compound of the formula R—NH$_2$ ranging from 1:0.8 to 1:1.3 and the molecular ratio of dicyandiamide to formaldehyde from 1:1.8 to 1:2.3.

As basic compounds of the general formula H$_2$N—R there are suitable aliphatic, cycloaliphatic, aromatic and heterocyclic monoamines, for example ammonia, methylamine, ethylamine, ethanolamine, allylamine, n-propylamine, n-butylamine, isobutylamine, amylamine, stearylamine, oleylamine, cyclohexylamine, aniline, para-aminophenol, aminopyrimidine or aminopyridine. The amines are used in the form of their water-soluble salts, for example as salts of organic acids, such as formic or acetic acid, or preferably as salts of strong mineral acids such as hydrochloric or sulfuric acid. Preferred use is made of ammonium chloride. The formation of the bicyclic ring system may be illustrated by the following scheme:

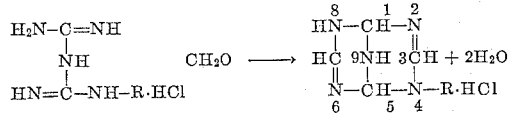

Adduct of NH$_2$—R.HCl with dicyandiamide
R represents a hydrogen atom or an unsubstituted or substituted alkyl, cycloalkyl, aryl or heterocylic radical.

The new bicyclic products are strong bases. In the form of their salts in aqueous solutions they are very stable. They are distinguished by two characteristic absorption maxima at 208 and 242 m$\mu$.

From the above scheme of reactions it is obvious that the condensation of 2 mols of formaldehyde with the adduct from 1 mol of a secondary amine with 1 mol of dicyandiamide cannot give rise to a bicyclic system as represented by Formula I. To achieve cyclization of the atoms 2, 3 and 4 there is in the case of secondary amines no hydrogen atom attached to nitrogen atom 4. The condensation of 2 mols of formaldehyde with 1 mol of dicyandiamide and 1 mol of dibutylamine or 1 mol of diethanolamine does produce the expected absorption spectrum which does not correspond with the afore-mentioned bicyclic system.

The new bicyclic compound from 1 mol of dicyandiamide, 1 mol of ammonuim chloride and 2 mols of formaldehyde forms with 0.1 N-potassium cyanide solution at 60 to 70° C. a yellow dyestuff which displays an absorption maximum at 472.5 m$\mu$. The mean absorption coefficient is 9.92 per gram of substance in 1000 ml. This color reaction is specific and the following compounds do not form this dyestuff with potassium cyanide: Dicyandiamide, dicyandiamidine, biguanide nitrate, guanidine nitrate, biuret, urotropin, formaldehyde and ammonium chloride.

The bicyclic compounds of the general Formula I are obtained in the form of aqueous solutions. The viscosity of the 50% solutions at 20° C. ranges from 0.8 to 1.5 stokes depending on the methanol content of the formaldehyde used. On evaporation of the water content there are obtained products melting from 185 to 215° C. depending on the starting materials chosen. The products manufactured by the present process are of low molecular weight and not cross-linked.

Of special significance is the molecular ratio at which the starting materials are used. For 1 mol of dicyandiamide there should be used 0.8 to 1.3 mols of the salt of the basic compound of the general formula R—NH$_2$ and 1.8 to 2.3, preferably 1.8 to 2.2 mols of formaldehyde. As a matter of fact, it was observed that a smaller yield of the bicyclic compound of the Formula I is obtained by using for every 1 mol of dicyandiamide and 2 mols of formaldehyde less than 0.8 mol or more than 1.3 mols of the salt of the compound R—NH$_2$. When less than 1.8 or more than 2.3 mols of formaldehyde is used for every 1 mol of the salt of the compound R—NH$_2$ and 1 mol of dicyandiamide, the yield of the bycylic compound of the Formula I is likewise reduced.

At the start of the reaction the temperature drops for a short period, whereupon the exothermic reaction causes it to rise again to about 50 to 80° C. For the manufacture of the bicyclic compound of the invention it is important that the reaction mass should not be left to itself or cooled but that a temperature above 65° C., preferably from 65 to 95° C., should be maintained for ½ to 3 hours by heating. If the reaction is performed at a temperature below 60° C. by cooling or other measures, the resulting yield of the desired bicyclic compound is insignificant.

The formaldehyde is generally used in the form of its aqueous solution of 37% strength which may be stabilized by an addition of 7 to 15% of methanol. Instead of formaldehyde paraformaldehyde may be used. Instead of an ammonium salt there may be used hexamethylenetetramine, while making good the deficiency of formaldehyde and the corresponding quantity of acid.

As a rule the condensation is performed thus: The formaldehyde is first introduced into the reaction vessel, and then the salt of the primary amine and dicyandiamide are vigorously stirred in as rapidly as possible. On completion of the reaction, which takes place at 65 to 85° C., the bicyclic compound can be isolated by evaporating the water. As a rule, the condensation product is not isolated but is used in the form of the solution obtained from the reaction.

The bicyclic compound of the general Formula I is a cationic, low-molecular compound which enables it to be used wherever products possessing these properties are required. They are specially suitable as precipitants and additives for preferably anionic compounds. The products of this invention are suitable for fixing acid dyestuffs and direct dyestuffs on cotton and paper. When used as agents improving the wet fastness of cotton dyeings they ensure minor bleeding out in the after-treating bath, good stability towards steaming and fastness to light and, in the case of alkyl- or aryl-substituted bicyclic compounds, excellent stability towards salts. The products may also be used in combination with aminoplasts as auxiliaries for the manufacture of colored paper laminates. The products of this invention are also particularly suitable for use as auxiliaries in the leather industry, either as after-treating agents for leather made by vegetable, synthetic or combined tanning methods, or as auxiliaries for dyeing with reactive dyestuffs. They are also suitable for use in the paper making industry, preferably as an agent for inhibiting the deposition of resinous matter, such as is present in wood pulp and in sulfite cellulose. The cationic products of this invention are advantageously added in the hollander to the paper pulp prepared from wood pulp or sulfite cellulose. Another possible use is based on the property that the new products are capable of precipitating colloids. They may be used, for example, for flocculating silver halide emulsions, and in this application they develop a very good precipitating effect and redispersibility. The new bicyclic compounds are also suitable for use as precipitants for purifying industrial effluents. Bicyclic compounds of this invention that are substituted by a long hydrocarbon chain containing, for example 16 to 18 carbon atoms, are also suitable for producing a soft handle on textile materials.

Parts and percentages in the following examples are by weight, unless otherwise indicated.

*Example 1*

3.25 kg. (40 mols) of 37% formalin solution are introduced in a 10-litre reactor and, while stirring vigorously, 1.66 kg. (20 mols) of dicyandiamide and 1.07 kg. (20 mols) of ammonium chloride are added as rapidly as possible. The temperature drops to 14° C., then rises within 10 minutes to 20° C. and from then onwards by about 1° C. per minute to 30° C. The temperature continues to rise and reaches within about 4 minutes a maximum of 88° C. in spite of the reactor being cooled. By heating, the batch is maintained for 2 hours at 80 to 85° C. There are obtained 5.98 kg. of a condensation product in the form of a solution of 57% strength whose viscosity at 25° C. is 2.5 stokes; its pH is 3.2 at 25° C. and its specific gravity is 1.2368.

When a dilute aqueous solution of the product is treated with sodium oleate solution, the sparingly soluble oleate precipitates.

*Analysis.*—Calculated: C, 64.8%; H, 10.2%; N, 17.2%. Found: C, 63.46%; H, 9.56%; N, 17.18%.

The sparingly soluble picrate is precipitated from a dilute aqueous solution; after two recrystallizations from water it melts at 223° C.

*Analysis.*—Calculated: C, 33.8%; H, 2.82%; O, 31.62%; N, 31.63%. Found: C, 33.74%; H, 2.81%; O, 31.97%; N, 31.18%.

*Example 2*

60 g. (2 mols) of paraformaldehyde are dissolved in 170 g. of water with heating, and the solution is allowed to cool and then stirred into 53.5 g. (1 mol) of ammonium chloride and 84 g. (1 mol) of dicyandiamide. At first the temperature drops to 9° C. and then rises within 35 minutes to 90° C. To prevent the temperature from rising further, the batch is cooled to 80° C. and maintained at this temperature for 2 hours. On evaporation of the water a salt-like stable and colorless product is obtained which is soluble in water in any desired proportion.

*Example 3*

162 g. (2 mols) of 37% formaldehyde, stabilized with 7.5% of methanol referred to the formaldehyde solution, are stirred in one lot into a mixture of 53.5 g. (1 mol) of ammonium chloride, 84 g. (1 mol) of dicyandiamide, 21.7 g. of methanol and 50 g. of water. At first the temperature drops and then rises again gradually to 67° C. The initially turbid solution turns clear at 36° C. The reaction mixture is heated for 2 hours at 85° C. The viscosity according to Gardner of the final product is A–2. The solution is evaporated to dryness on a steam bath and the residue dried under vacuum at 60° C. The white, salt-like product melts at 195° C.

*Example 4*

The reactor is charged at room temperature with a mixture of 168 g. (2 mols) of dicyandiamide, 70.1 g. (0.5 mol) of hexamethylenetetramine, 81 g. (1 mol) of 37% formaldehyde and 38.5 g. of water, and 197.4 g. (2 mols) of hydrochloric acid of 37% strength are vigorously stirred in within half an hour. The temperature rises gradually to 68° C. The reaction mixture is then maintained for 2 hours at 80° C. The solution has a pH value of 5.

*Example 5*

1 mol of formaldehyde (in the form of a solution of 37% strength) is introduced in the reactor, and 1 mol of ammonium chloride, 1 mol of dicyandiamide and 1 mol of para-formaldehyde are added. The temperature drops to 19° C. and then rises slowly to 42° C. The batch is heated to 80° C., whereafter the exothermic reaction causes the temperature to rise to 96° C. The batch is cooled to 80° C. and maintained at this temperature for 2 hours. The resulting solution is clear at 6 to 7° C. and at room temperature. It has a dry content of 67.5%.

*Example 6*

83 g. (1 mol) of dicyandiamide and 124.5 g. (1 mol) of n-butylamine hydrochloride of 88% strength are vigorously stirred into 202 g. (2 mols) of formaldehyde of 30% strength which is free from methanol. The temperature rises to 79° C. within 30 minutes. Condensation is performed for 12 hours at 100° C., to yield a thinly liquid, faintly yellowish solution having a dry content of 57.8%.

*Example 7*

0.2 mol (13.8 g.) of methylamine hydrochloride and 0.2 mol (16.8 g.) of dicyandiamide are vigorously stirred into 0.4 mol (32.4 g.) of formaldehyde of 37% strength. The temperature drops at the start and then rises to a maximum of 73° C. without external heat being supplied. After a reaction period of 3 hours at 80° C., a colorless, clear solution is obtained which can be diluted with water in any desired proportion.

A solution containing 3.3 g. of the product per litre, referred to its dry content, and 10 g. of sodium sulfate per litre remains completely clear even after having been allowed to stand for 4 hours at room temperature. The same result is obtained with solutions of 10 g. of trisodium phosphate or of 2.2 g. of copper sulfate per litre. The salt-stability of the after-treating agents is of special significance for the after-treatment of cross-wound bobbins where the complete washing out of the salts contained in the dye liquor is often difficult.

When the above product is used for after-treating cotton satin dyed with direct dyestuffs, the amount of dyestuff migrating into the after-treating bath is of a very minor order. The treated material is distinguished by its good fastness to wetting.

The following products are manufactured in an analogous manner, using in each case instead of methylamine hydrochloride an equivalent amount of the amine hydrochloride shown in the following table:

| Amine hydrochloride | Maximum exothermic reaction temperature °C. | Aspect of solutions of the products | | | |
|---|---|---|---|---|---|
| | | 33% dry content | 3.3 g./litre dry product + | | |
| | | | 10 g./l. Na₂SO₄ | 10 g./l. Na₃PO₄ | 2.2 g./l. CuSO₄ |
| Ethanolamine hydrochloride | 78 | Light yellow | Clear | Clear | Clear. |
| Ethylamine hydrochloride | 70 | Light brown | do | do | Do. |
| Allylamine hydrochloride | 86 | Light yellow | do | do | Do. |
| Diethylamino-n-propylamine hydrochloride. | 71 | Colorless | do | do | Do. |
| Diethylaminoethylamine dihydrochloride | 85 | Light yellow | do | do | Do. |
| Aminopropylmorpholine dihydrochloride | 80 | Yellow | do | do | Do. |
| Aminoethylpiperazine trihydrochloride | 78 | Brown | do | do | Do. |

*Example 8*

0.2 mol (13.9 g.) of hydroxylamine hydrochloride and 0.2 mol (16.8 g.) of dicyandiamide are added to a solution of 0.4 mol (33 g.) of 37% formaldehyde in 40 cc. of water. In spite of the dilution, the reaction is still very exothermic. After two hours' reaction at 80° C. a colorless solution is obtained which has a dry content of 38%. When this product is tested for its stability towards salts as described in Example 7, it is revealed that with all three salts used in Example 7 there appears at first only a faint opalescence which is transformed into a precipitate in the ensuing 4 hours.

*Example 9*

0.2 mol (13.8 g.) of hydrochloric acid of 37.5% strength are added dropwise to 0.2 mol (19.8 g.) of cyclohexylamine while cooling at 40° C. The batch is cooled to room temperature, and 0.4 mol (32.4 g.) of 37% formaldehyde and 0.2 mol (16.8 g.) of dicyandiamide are added. The temperature rises to 42° C. without external heat being supplied. The batch is then allowed to react further for 3 hours at 80° C., to yield a clear, light brown solution having a dry content of 56%. When the stability to salts is tested as in Example 7, it is found that sodium sulfate and trisodium phosphate produce precipitates with this product, whereas copper sulfate in an amount of 2.2 g. per litre is compatible with it.

In an analogous manner further products are manufactured by using instead of cyclohexylamine an equivalent amount of aniline and para-aminophenol respectively.

| Amine | Maximum exothermic reaction temperature °C. | Dry content of solution | Aspect of solutions of the products | | | |
|---|---|---|---|---|---|---|
| | | | 33% dry content | 3.3 g./litre dry product + | | |
| | | | | 10 g./l. Na₂SO₄ | 10 g./l. Na₃PO₄ | 2.2 g./l. CuSO₄ |
| Aniline | 46 | 52 | Dark brown | Precip | Precip | Clear. |
| p-Aminophenol | 78 | 59.2 | do | Precip | Clear | Precip. |

*Example 10*

0.4 mol (27.6 g.) of 37.5% hydrochloric acid are added at 35 to 40° C. to 0.2 mol (18.8 g.) of aminopyridine. After cooling to room temperature, 0.2 mol (16.8 g.) of dicyandiamide and 0.4 mol (32.4 g.) of 37% formaldehyde are vigorously stirred in. The exothermic reaction causes the temperature to rise to 49° C. The batch is immediately heated to 80° C. and allowed to react at this temperature for 3 hours, to yield a yellow solution having a dry content of 59%. This product produces a precipitate with sodium sulfate, trisodium phosphate and copper sulfate.

In an analogous manner a product is prepared, using instead of aminopyridine an equivalent amount of amino-pyrimidine. The released heat of reaction raises the temperature of the solution to 48° C. After allowing it to react for 3 hours at 80° C. an orange-colored solution is obtained which has a dry content of 50%. The product produces precipitates with all three of the salts mentioned above.

*Example 11*

The reactor is charged with 0.5 mol (134.5 g.) of distilled stearylamine with 100 cc. of water under nitrogen, and 0.5 mol (50.0 g.) of 36.5% hydrochloric acid are stirred in at 70° C. The batch is then stirred for 2 hours at 70° C., cooled to 56° C., and 1 mol (81 g.) of 37% formaldehyde and 0.5 mol (42 g.) of dicyandiamide are added. The exothermic reaction raises the temperature to 77° C. After 2 hours at 80° C. the reaction is complete and a white, only slightly foamy paste of 51% dry content is obtained. Since this product solidifies when it is allowed to cool to room temperature and is then difficult to handle, it is diluted to a dry content of 20% while still hot, to form a white cream which is an excellent agent for imparting a soft handle to cotton yarn.

*Example 12*

The reactor is charged under nitrogen with 0.5 mol (135 g.) of oleylamine and 100 cc. of water, and 0.5 mol (49.5 g.) of 37% hydrochloric acid are stirred in at 60 to 70° C., whereupon the mixture is stirred for one hour at 70° C. until it is homogeneous. The foamy mass is allowed to cool to 50° C., and 1 mol (81 g.) of 37% formaldehyde and 0.5 mol (42 g.) of dicyandiamide are added. The temperature, which in the meantime has dropped to 45° C., is caused by the heat of reaction to rise again to 67° C. After 3 hours at 80 to 85° C. the reaction is complete and yields a white, viscous paste of 49.8% dry content which is diluted to a dry content of 20% while still hot. After cooling, a thinly liquid dispersion is obtained. The product may be used as a non-hydrophobizing agent imparting a soft handle to viscose rayon and cotton.

*Example 13*

84 g. (1 mol) of dicyandiamide and 53.5 g. (1 mol) of ammonium chloride are vigorously stirred into 182.3 g. (2.25 mols) of commercial formaldehyde of 37% strength. At first the temperature drops to 14° C., then rises again, initially slowly and then above 40° C. rather rapidly, until it reaches a maximum of 90° C. To complete the reaction the batch is finally stirred for 2 hours at 80° C., whereupon after only 50 minutes the solution is found to have a pH value of 4. The final product forms at 20° C. a jelly of 54.2% dry content which dissolves readily in water.

Example 14

1.25 mols (66.6 g.) of ammonium chloride and 1 mol (84 g.) of dicyandiamide are added to 2 mols (162 g.) of formaldehyde of 37% strength. At first the temperature drops to 12° C. and then rises again to 71° C. without supplying any external heat. After 2 hours at 80° C. the reaction is complete and yields a solution of 52.3% dry content which is clear and easy to cast at 20° C. When it is cooled to 7 to 8° C., it separates into two liquid phases which can be mixed again after having been heated to room temperature.

Example 15

1.1 mols (92.5 g.) of dicyandiamide and 1 mol (53.5 g.) of ammonium chloride are added to 2 mols (162 g.) of formaldehyde of 37% strength, whereupon the temperature at first drops to a minimum of 12° C. and then, without supply of external heat, rises again to a maximum of 72° C.

After 2 hours at 80° C. the reaction is complete, and the dry content of the solution is then 52.2%. The product is clear and thickly viscous at 7° C. as well as at 20° C.

Example 16

Mercerized cotton satin is dyed with 2.9% of the brown dyestuff of the following formula

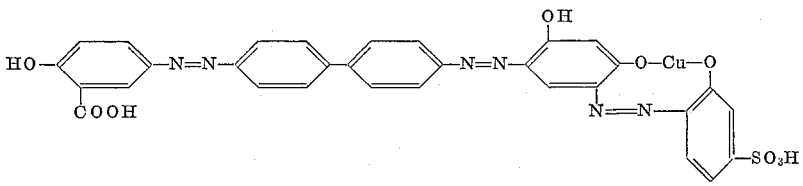

referred to the weight of the fibre material. The dyed satin is then treated for 30 minutes at 25° C. in a bath containing 2% (referred to the weight of the fibre) of a 50% solution of the condensation product described in Example 5 at a goods-to-liquor ratio of 1:30. The treated satin is centrifuged and dried at 70 to 80° C. The dyeings are distinguished by their little bleeding in the after-treating bath, by good stability to steaming and a relatively minor impairment of the fastness to light.

Example 17

A machine used for making paper from waste paper and wood pulp must, as a rule, be cleaned at least 3 times within 24 hours because of the resin deposits on the metal parts. Each cleaning operation involves a stoppage of half an hour in the paper production.

According to this invention 0.25% (referred to the dry pulp material from waste paper and wood pulp) of a 50% solution of the bicyclic compound obtained as described in Example 1 is added to the pulp. The addition of the product of the invention inhibits the adhesion of resin deposits, and the installation will produce paper for 6 days without interruption.

Example 18

On a paper making machine a white paper is produced which is to be used for the manufacture of copy paper, using unbleached sulfite cellulose. Within 2 days so much resin deposits on the fourdrinier wire and on the felt that thorough cleaning of the machine is unavoidable. 500 to 700 g. per ton of sulfite cellulose of a 30% solution of the condensation product prepared as described in Example 1 are then added to the paper pulp in the hollander. During a 3 weeks' production run no resin deposits are found either in the hollander or on the paper making machine.

Example 19

100 parts of a reaction product from pure melamine and formaldehyde in the molecular ratio of 1:2 are dissolved with stirring in 55 parts of softened water at 40 to 50° C. After cooling, 5 parts of a 10% aqueous dispersion of α-copper phthalocyanine having a maximum particle size of 5μ, then 15 parts of a fine, aqueous 50% zinc sulfide dispersion, followed by 5 parts of a 55% aqueous solution of the condensation product of Example 1, and finally 5 parts of 10% solution of sodium diisobutyl-sulfonate are added. White paper, weighing 150 g. per square metre, is evenly impregnated with the resulting blue melamine resin preparation. The excess solution is removed with a suitable device and the paper is dried for 20 minutes at 80° C., during which the melamine resin undergoes a certain degree of condensation.

A laminate is prepared from the following plies:

(a) Strong paper from unbleached sulfite or sulfate cellulose (so-called kraft paper) which has been impregnated with an aqueous solution of a phenol-formaldehyde resin, then pressed and dried, (b) White interlay paper (blocking sheet) impregnated with an aqueous solution of the above-mentioned melamine-formaldehyde reaction product, then pressed and dried, (c) Paper which has been treated with the pigmented resin preparation made as described above.

Equally large sheets of the materials prepared in this manner are placed on top of one another, namely first 3 to 5 plies of paper (a), one ply of paper (b) and one ply of paper (c); the whole is covered on the colored side with a mirror chromed plate and compressed for 15 minutes at 145° C., under 100 kg. pressure per square centimetre, then cooled to 30° C., and the laminate thus formed is removed from the press. Its surface displays a very even blue shade.

Example 20

100 parts of glove leather are drummed in the usual manner and then treated for 10 to 15 minutes in 10 times the amount of water heated at 50 to 60° C., with 4 parts of ammonia of 25% strength and 1.8 parts of the solution prepared as described in Example 5. The leather is then dyed for 1 to 1½ hours in the same bath with 5 parts of the dyestuff of the formula

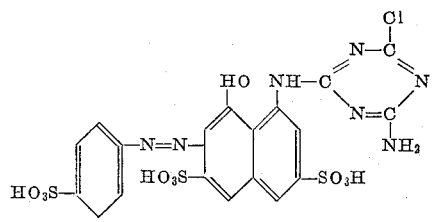

and 5 parts of a 5% solution of N,N-dimethylhydrazine; during the whole of this period the dyebath should be kept at an alkaline reaction. The leather is then rinsed washed, neutralized with formic or acetic acid and finally greased. The resulting leather displays a very strong red shade. The dyeings have good fastness to wetting, and especially good fastness to washing and perspiration. If the dyeing is performed in the absence of the condensation product of Example 5, the resulting shade is considerably weaker and when the dyed leather is rinsed and washed, the bulk of the dye is washed out of it.

Example 21

The following ingredients are introduced into a hollander:
400 kg. of bleached sulfite cellulose RKN 15
80 kg. of kaolin
4 kg. of the dyestuff of the formula

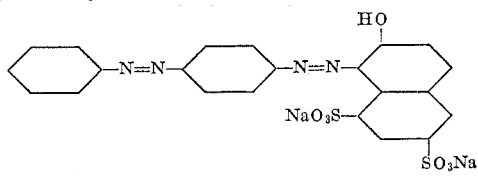

12 kg. of aluminum sulfate.

The dyestuff exhaustion is measured colorimetrically and amounts to about 30%. The remainder of 70% has escaped fixation and passes into the waste water.

On addition of 0.5 % (2 kg.) of a 50% solution of the condensation product according to Example 1 before the dyestuff is added, the dyestuff exhaustion is raised to about 85%. In this manner alone a saving of 55% of dyestuff is achieved and the effluent is substantially colorless. On addition of 2% (8 kg.) of this product a dyestuff exhaustion of about 100%, that is to say completely clear wash water, is obtained. Moreover, the addition of the product improves significantly the sizing degree of the paper and improves the filler retention.

Example 22

1 litre of strongly colored chemical effluent is mixed with an amount of ferrous sulfate corresponding to 25 mg. of iron, and the whole is rendered alkaline to phenolphthalein with sodium hydroxide solution while being stirred. To allow the flocks to settle out, the solution is poured into an Imhoff cylinder.

1 litre of strongly colored chemical effluent is mixed with an amount of ferrous sulfate corresponding to 25 mg. of iron and with 100 mg. of the bicyclic compound obtained in Example 1. The whole is stirred with sodium hydroxide solution until an alkaline reaction to phenolphthalein has been attained. To allow the flocks to settle out, the solution is poured into an Imhoff cylinder.

No brightening of the color was observed with the solution flocked with iron alone.

The solution flocked with iron and the product of Example 1 displayed a brightening effect of 80%.

What is claimed is:

1. A process for the manufacture of 2,4,6,8,9-pentaazabicyclo-[3,3,1]-nona-2,6-dienes of the formula

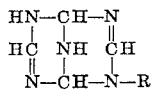

where R represents a member selected from the group consisting of hydrogen, alkyl, alkenyl, cycloalkyl, hydroxyalkyl, dialkylaminoalkyl, phenyl, hydroxyphenyl, (N-morpholyl)alkyl and pyridyl, wherein (1) a salt from an acid and a nitrogen base of the formula $R-NH_2$ (where R has the same meaning as above) is reacted in an acid aqueous solution with (2) dicyandiamide and (3) formaldehyde at a temperature above 65° C., the molecular ratio of dicyandiamide to the salt of the compound of the formula $R-NH_2$ ranging from 1:0.8 to 1:1.3 and the molecular ratio of dicyandiamide to formaldehyde ranging from 1:1.8 to 1:2.3.

2. A process as claimed in claim 1, wherein the reaction is accomplished within ½ to 3 hours.

3. A process as claimed in claim 1, wherein the reaction solution contains 35 to 70% by weight of the starting materials (1), (2) and (3).

4. A process as claimed in claim 1, wherein ammonium chloride is used as the salt from an acid and a nitrogen base of the formula $R-NH_2$.

5. A bicyclic compound of the formula

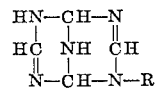

where R represents a member selected from the group consisting of hydrogen, alkyl, alkenyl, cycloalkyl, hydroxyalkyl, dialkylaminoalkyl, phenyl, hydroxyphenyl, (N-morpholyl)alkyl and pyridyl.

6. The bicyclic compound of the formula

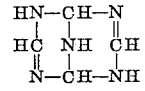

No references cited.

WALTER A. MODANCE, *Primary Examiner.*
JOHN M. FORD, *Assistant Examiner.*